(12) United States Patent
Soong et al.

(10) Patent No.: US 9,543,783 B2
(45) Date of Patent: Jan. 10, 2017

(54) CHARGING MODULE AND RECHARGEABLE BATTERY ASSEMBLY FOR ELECTRIC VEHICLE

(75) Inventors: Tzu-Wen Soong, New Taipei (TW); Ching-Tsung Hu, New Taipei (TW)

(73) Assignee: Go-Tech Energy Co., Ltd., New Taipei (TW)

( * ) Notice: Subject to any disclaimer, the term of this patent is extended or adjusted under 35 U.S.C. 154(b) by 987 days.

(21) Appl. No.: 13/084,699

(22) Filed: Apr. 12, 2011

(65) Prior Publication Data
US 2012/0262110 A1 Oct. 18, 2012

(51) Int. Cl.
*H02J 7/00* (2006.01)
*H02J 7/04* (2006.01)

(52) U.S. Cl.
CPC ............... *H02J 7/04* (2013.01); *H02J 7/0004* (2013.01); *H02J 2007/0096* (2013.01); *H02J 2007/0098* (2013.01)

(58) Field of Classification Search
CPC .............. H02J 7/0004; H02J 2007/0096; H02J 2007/0098; H02J 7/04
USPC ......................................... 320/109, 106, 132
See application file for complete search history.

(56) References Cited

U.S. PATENT DOCUMENTS

| | | | |
|---|---|---|---|
| 2007/0080662 A1* | 4/2007 | Wu | 320/110 |
| 2008/0281732 A1 | 11/2008 | Yamada | |
| 2010/0019719 A1* | 1/2010 | Okabayashi | 320/106 |
| 2010/0121511 A1* | 5/2010 | Onnerud et al. | 701/22 |
| 2011/0084664 A1* | 4/2011 | White et al. | 320/134 |
| 2011/0215758 A1* | 9/2011 | Stahlin | G07C 5/008 320/109 |
| 2011/0258112 A1* | 10/2011 | Eder et al. | 705/39 |
| 2011/0298422 A1* | 12/2011 | Failing | B60L 3/00 320/109 |
| 2012/0242288 A1* | 9/2012 | Birke | B60L 11/1809 320/109 |

FOREIGN PATENT DOCUMENTS

| | | |
|---|---|---|
| CN | 101969218 A | 2/2011 |
| CN | 101997326 A | 3/2011 |
| WO | WO2010043659 * | 4/2010 |

OTHER PUBLICATIONS

Chinese Office Action of corresponding Chinese Application No. 201110263615.X dated Jan. 22, 2014.

* cited by examiner

*Primary Examiner* — Nathaniel Pelton
(74) *Attorney, Agent, or Firm* — Che-Yang Chen; Law Offices of Scott Warmuth

(57) ABSTRACT

A rechargeable battery assembly for an electric vehicle is disclosed in the present invention. It includes at least one rechargeable battery module which has a number of rechargeable battery cells linked in series or in parallel for providing power to the electric vehicle, and a management unit, installed with a first program, for managing the rechargeable battery cells; and a charging module for providing power to the rechargeable battery module, including an updating unit connected to the charging module for automatically detecting version of the first program and updating the first program while a newer version is available while electrically connected to the rechargeable battery module. Battery management system of the rechargeable battery assembly can be updated by the updating unit. Therefore, the rechargeable battery module can be applied to different requirements with its best performance.

12 Claims, 5 Drawing Sheets

CHARGING MODULE AND RECHARGEABLE BATTERY ASSEMBLY FOR ELECTRIC VEHICLE

FIELD OF THE INVENTION

The present invention relates to a charging module and a rechargeable battery assembly. More particularly, the present invention relates to a charging module and a rechargeable battery assembly having a management unit installed with a program for managing rechargeable battery cells of electric vehicles.

BACKGROUND OF THE INVENTION

An electric vehicle, also referred to as an electric drive vehicle, is a moving vehicle using one or more electric motors as driving system. Unlike petroleum-based transportations which are moved by the energy from gasoline, the electric vehicles use electric power as their propulsion. They won't generate waste gas. Noise is also less. During the last few decades, increased concern over the environmental impact of the petroleum-based transportation, along with the spectre of peak oil, has led to renewed interest in electric transportation. Electric power for electric vehicles can be generated from a wide range of sources, including fossil fuels, nuclear power, and renewable sources such as tidal power, solar power, and wind or any combination of those.

In the past, an electric vehicle consumes huge electric power due to their power system. The electric power can only be transmitted to the car through overhead lines. This infrastructure makes the electric vehicles impossible to be popular. Only some of public transportations have access to it. Routes of the public transportation are strictly limited by the lined arrangement. With the development in power systems of electric vehicles, especially in batteries, the electric vehicles become a future star and more and more sources are devoted in this field.

Although electric vehicle batteries are more and more efficient and can support an electric vehicle to run over 150 Km without charge, battery management still has room to improve. Like other electric devices, such as notebook, rechargeable battery cells of electric vehicle are also composed of many small rechargeable battery units (cells) linked to one another in series or parallel. Team work of the cells is the performance of the rechargeable battery. Battery management is more complex for an electric vehicle. This is because cells in a rechargeable battery often up to several thousands.

It is obvious that electric vehicle battery management requests more advanced technique to run the cells and prevent each cell from over-heat, over-voltage and over-current. Meanwhile, when one or more cells are out of order, a battery management system (BMS) must know how to work the rest cells to maximize the efficiency. No matter what kinds of electric devices are used, battery management system is often software or firmware, such as one time programmable (OTP) memory. The battery management system can be updated for new management processes. However, since the BMS is software or firmware, the BMS is not able to be separated from the rechargeable battery. It causes problems to use the rechargeable battery cells. For example, if a rechargeable battery used for car A needs to be changed to car B, due to different performances of the cars, different battery management systems must be applied for different cars.

There are some methods to improve battery management system for electric vehicle. U.S. Pat. No. 7,233,127 discloses a battery management system. Please refer to FIG. 1. The battery management system for managing a number of subsystem circuits and functions of a mobile communication device powered by a battery is disclosed. The battery management system includes a battery monitoring circuit, a user interface, and a battery management module. The battery monitoring circuit is operable to monitor a present battery capacity and generate a battery capacity signal based on the present battery capacity. The user interface is operable to receive a user-input allocation of battery capacity among the subsystem circuits and functions. The battery management module is operable to receive the user-input allocation and the battery capacity signal, and to selectively disable each subsystem circuit or function when each subsystem circuit or function has depleted its allocation of battery capacity. Although users can selectively disable each subsystem circuit or function to achieve the goal of updating current battery management system, it is not applied to any new systematic update, especially to any update during charging of battery. Furthermore, this method is only applied to mobile communication devices.

Another prior art is shown in FIG. 2. U.S. Pat. No. 7,768,235 discloses another battery management system. The battery management system manages a battery of a hybrid vehicle including a motor, a battery, and a main switch connecting the motor and the battery. The battery management system includes a sensing unit and a micro center unit (MCU). The sensing unit measures the current, the voltage and the temperature of the battery. The MCU integrates the battery current to produce an integrated current value, and determines whether the battery is overcharged or over discharged using the integrated current value. It is a typical battery management system for a hybrid vehicle, not for an electric vehicle. Meanwhile, the battery management system can not be updated.

Thus, a charging module and a rechargeable battery for electric vehicles having a battery management system which can be updated for different requirements are still desired. Preferably, the battery management system can be updated when the vehicle or rechargeable battery is being charged.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a rechargeable battery assembly for an electric vehicle includes at least one rechargeable battery module having a plurality of rechargeable battery cells linked in series or in parallel for providing power to the electric vehicle; and a management unit, installed with a first program, for managing the rechargeable battery cells; and a charging module for providing power to the rechargeable battery module, including an updating unit connected to the charging module for automatically detecting version of the first program and updating the first program while a newer version of the first program is available while electrically connected to the rechargeable battery module.

Preferably, the electric vehicle is installed with a second program.

Preferably, the updating unit is stored with latest versions of the first program and the second program.

Preferably, the latest versions of the first program and the second program are downloaded to the updating unit via local area network (LAN), wide area network (WAN), wireless LAN or wireless WAN.

Preferably, the updating unit automatically detects version of the second program and updates the second program while a newer version of the second program is available while electrically connected to the electric vehicle.

Preferably, the second program is stored in the rechargeable battery module.

Preferably, the updating unit automatically detects version of the second program stored in the rechargeable battery module and updates the second program while a newer version of the second program is available while electrically connected to the rechargeable battery module.

Preferably, the management unit monitors operation performance and status of each rechargeable battery, and protects the rechargeable battery cells from over-heat, over-voltage, over-current and over-charge.

Preferably, the operation performance comprises output voltage, state of charge (SOC), depth of discharge (DOD), state of health (SOH), output current, maximum charge current, and maximum discharge current.

Preferably, the status of the rechargeable battery comprises cycle count and lifetime.

Preferably, the management unit comprises a programmable memory.

In accordance with another aspect of the present invention, a charging module for providing power to a rechargeable battery module of an electric vehicle includes an updating unit for automatically detecting version of a first program installed in the rechargeable battery module and updating the first program while a newer version of the first program is available while electrically connected to the rechargeable battery module.

Preferably, the electric vehicle is installed with a second program.

Preferably, the updating unit is stored with latest versions of the first program and the second program.

Preferably, the latest versions of the first program and the second program are downloaded to the updating unit via local area network (LAN), wide area network (WAN), wireless LAN or wireless WAN.

Preferably, the updating unit automatically detects version of the second program and updates the second program while a newer version of the second program is available while electrically connected to the electric vehicle.

Preferably, the second program is stored in the rechargeable battery module.

Preferably, the updating unit automatically detects version of the second program stored in the rechargeable battery module and updates the second program while a newer version of the second program is available while electrically connected to the rechargeable battery module.

DETAILED DESCRIPTION OF THE PREFERRED EMBODIMENT

Figure 4:
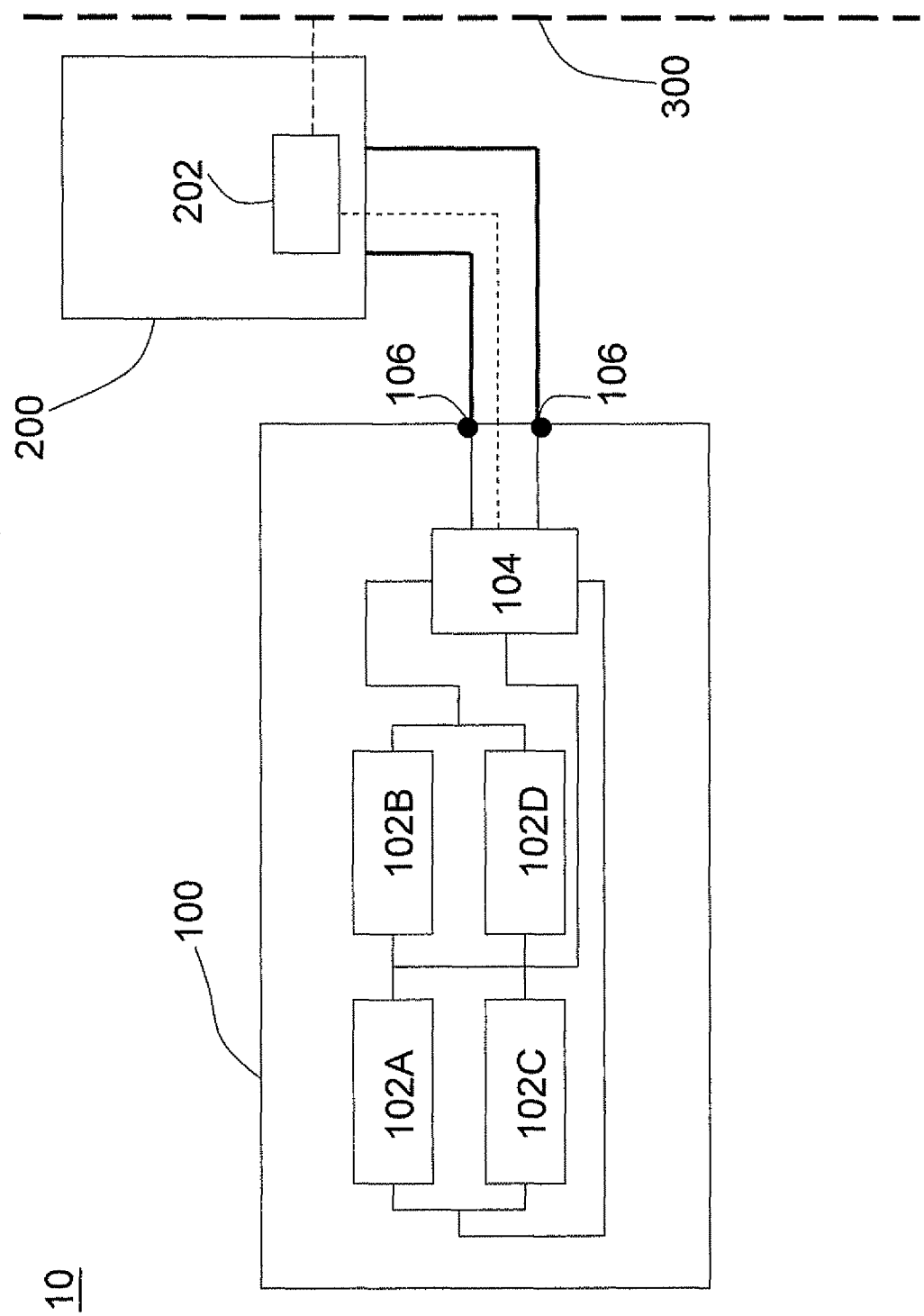
FIG. 4 describes an updating unit in the embodiment linking to network.
Figure 5:
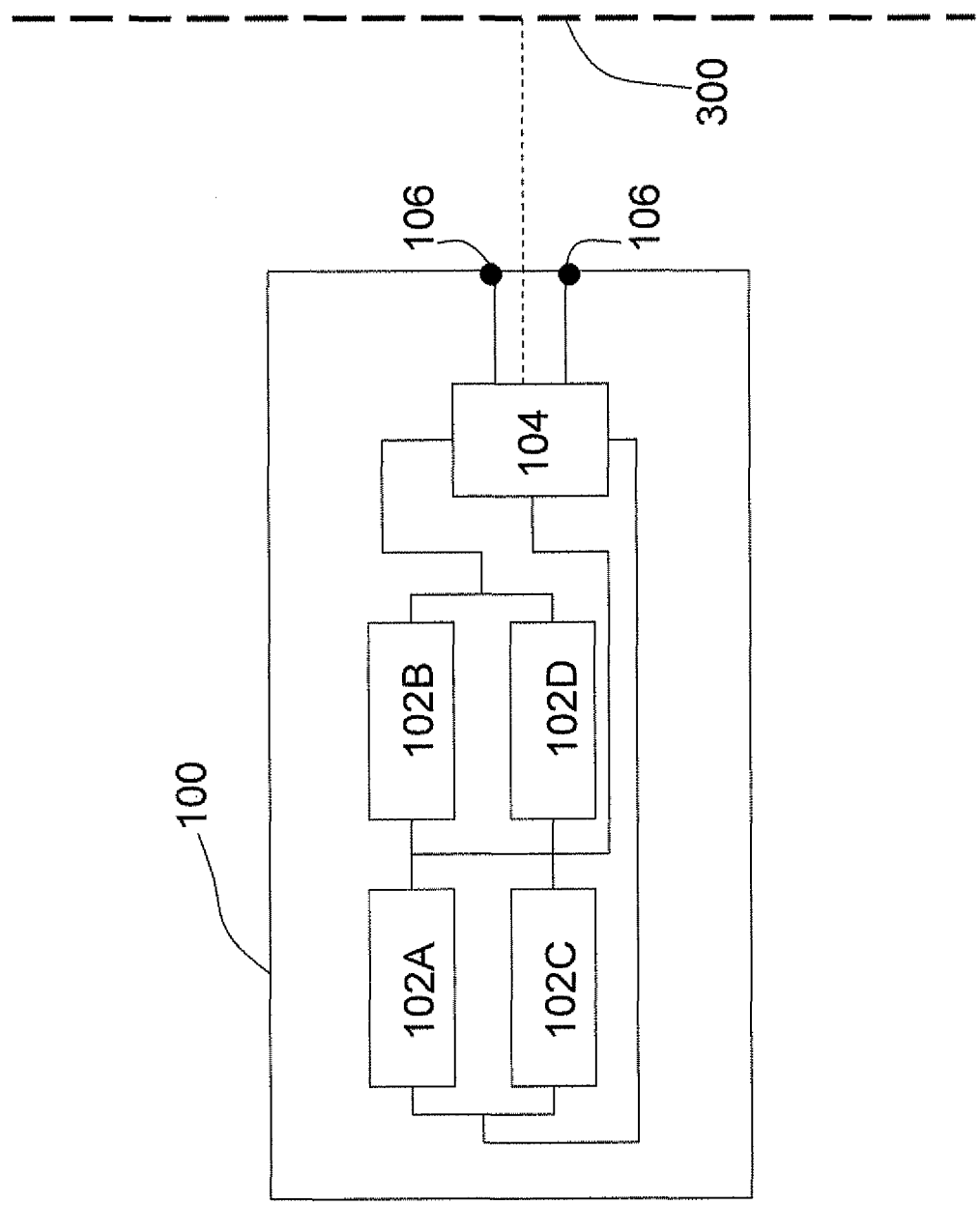
FIG. 5 describes a management unit in the embodiment linking to network.

The present invention will now be described more specifically with reference to the following embodiment. It is shown in FIG. 3 to FIG. 5.

Figure 1:
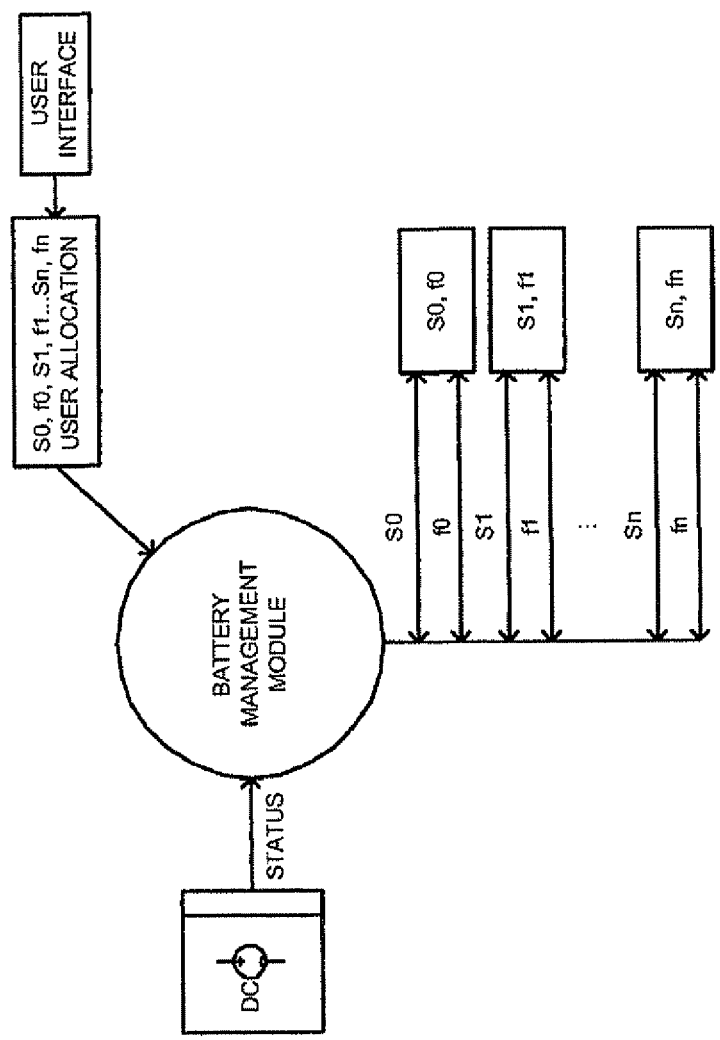
FIG. 1 shows a prior art of a battery management system.
Figure 2:
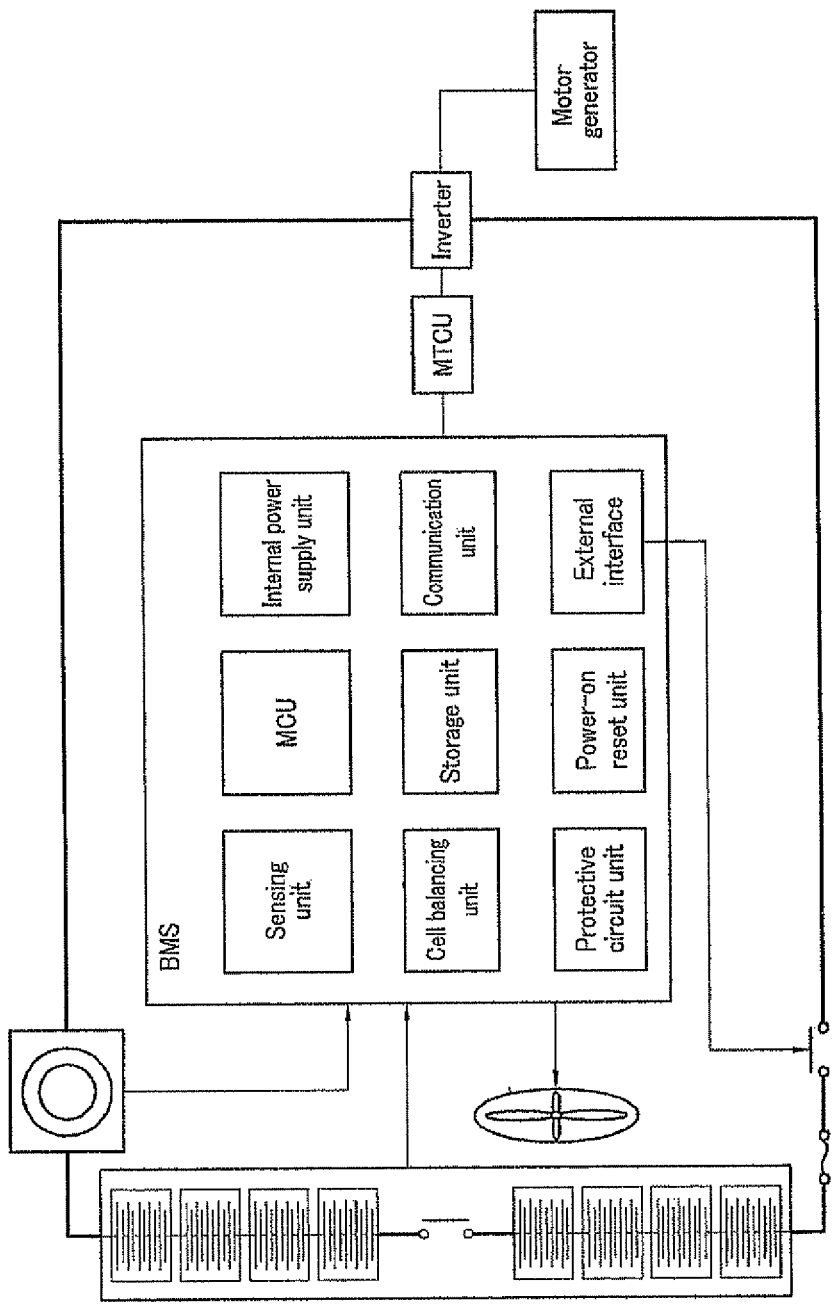
FIG. 2 shows another prior art of a battery management system.
Figure 3:
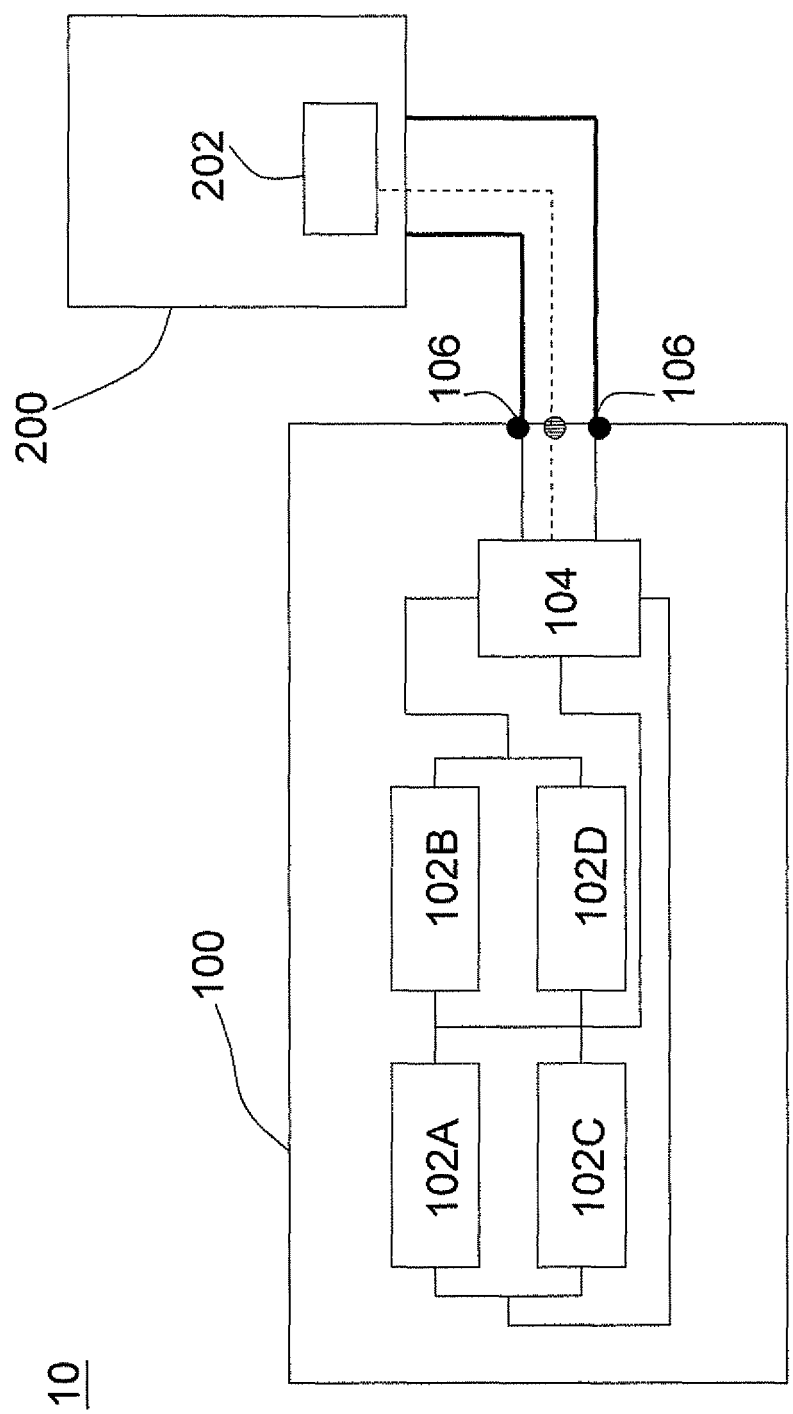
FIG. 3 illustrates an embodiment of the present invention.

Please refer to FIG. 3. A rechargeable battery assembly 10 for an electric vehicle (not shown) is described in the present embodiment. The rechargeable battery assembly 10 is composed of two major parts: at least one rechargeable battery module 100 and a charging module 200. Like a common rechargeable battery set of an electric vehicle, the rechargeable battery module 100 has many rechargeable battery cells.

Generally, the rechargeable battery cells have a number of at least 1000 and are linked in series or in parallel for providing power to the electric vehicle. To simplify the battery structure, only a first rechargeable battery cell 102A, a second rechargeable battery cell 102B, a third rechargeable battery cell 102C and a fourth rechargeable battery cell 102D are shown in the embodiment. The first rechargeable battery cell 102A and second rechargeable battery cell 102B are linked in series. The third rechargeable battery cell 102C and fourth rechargeable battery cell 102D are linked in series. Two groups of battery cells are linked in parallel to provide power to the electric vehicle.

The rechargeable battery assembly 10 further has a management unit 104. It is installed with a battery management system in form of a program. The management unit 104 includes a programmable memory. The management unit 104 can manage the rechargeable battery cells 102A, 102B, 102C, and 102D. In practice, the management unit 104 monitors operation performance and status of each rechargeable battery, and protects the rechargeable battery cells from over-heat, over-voltage, over-current and over-charge. For example, if rechargeable battery cell 102A is detected to be over-heat, the management unit 104 can stop charging to the rechargeable battery cells 102A and 102B until the temperature cools down.

Here, the operation performance is defined as output voltage, state of charge (SOC), depth of discharge (DOD), state of health (SOH), output current, maximum charge current, or maximum discharge current. The status of the rechargeable battery includes cycle count and lifetime. The rechargeable battery cells 102A, 102B, 102C and 102D are nickel-cadmium battery cells. In practice, they can be nickel-metal hydride battery or lithium technology battery according to the requirement for design. The rechargeable battery module 100 has two electrodes 106 to contact the battery set (not show) in the electric vehicle to provide power to the electric vehicle. The electrodes 106 are also used as an interface for charging.

The charging module 200 is to provide power to the rechargeable battery module 100. It includes an updating unit 202 which is connected to the charging module 200. The updating unit 202 can automatically detect version of the battery management system and update the battery management system while a newer version is available while electrically connected to the rechargeable battery cells 102A, 102B, 102C and 102D of the rechargeable battery module 100. The updating unit 202 is always stored with latest versions of the battery management system.

Usually, the battery management system needs to be updated while a new method for managing battery cells, calculating health state or residue of battery capacity is developed.

Please refer to FIG. 4. The updating unit 202 is linked to network 300 which is a local area network (LAN), wide area network (WAN), wireless LAN or wireless WAN. Therefore, the latest version of the battery management system is downloaded to the updating unit via local area network (LAN), wide area network (WAN), wireless LAN or wireless WAN 300. Another way for the management unit 104 to update the latest version of the battery management system is to link the management unit 104 directly to the network 300. Please refer to FIG. 5. The battery management system of the rechargeable battery module 100 is updated via the network 300 without transmitting through any charging module.

Furthermore, like the battery management system of the rechargeable battery module 100, the electric vehicle is installed with an electric vehicle management system. A latest version of the electric vehicle management system is also stored in the updating unit 202 which stores the battery management system.

As the battery management system, the latest version of the electric vehicle management system is downloaded to the updating unit 202 via local area network (LAN), wide area network (WAN), wireless LAN or wireless WAN.

The updating unit 202 automatically detects version of the electric vehicle management system and updates the electric vehicle management system while a newer version of the electric vehicle management system is available while electrically connected to the electric vehicle since the rechargeable battery module 100 is not limited to be charged directly by the charging module 200, but also can be charged indirectly. That is, the charging module 200 can charge the rechargeable battery module 100 through the electric vehicle. In other words, the rechargeable battery module 100 dose not need to be removed from the electric vehicle in order to be charged.

Moreover, the rechargeable battery module 100 also stores a copy of the electric vehicle management system. Hence, the updating unit 202 also automatically detects version of the electric vehicle management system stored in the rechargeable battery module 100 and updates the electric vehicle management system while a newer version of the electric vehicle management system is available while electrically connected to the rechargeable battery module 100.

The electric vehicle management system of the electric vehicle will then be updated by the rechargeable battery module 100 once the rechargeable battery module 100 is placed into the electric vehicle.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A rechargeable battery assembly for an electric vehicle, comprising:
   at least one rechargeable battery module, comprising:
   a plurality of rechargeable battery cells linked in series or in parallel for providing power to the electric vehicle; and
   a management unit, installed with a battery management program, for managing the rechargeable battery cells; and
   a charging module for providing power to the rechargeable battery module, wherein the charging module comprises an updating unit for automatically detecting a version of the battery management program and updating the battery management program while a newer version of the battery management program is available while electrically connected to the rechargeable battery module,
   wherein the electric vehicle is installed with an electric vehicle management program;
   wherein the rechargeable battery module also stores a copy of the electric vehicle management program;
   wherein the updating unit automatically detects the versions of the electric vehicle management programs installed with the electric vehicle and stored in the rechargeable battery module and updates the electric vehicle management program which is installed with the electric vehicle while electrically connected to the electric vehicle or updates the electric vehicle management program which is stored in the rechargeable battery module while electrically connected to the rechargeable battery module while a newer version of the electric vehicle management program is available; and
   wherein the electric vehicle management program installed in the electric vehicle is additionally updated by the copy stored in the rechargeable battery module once the rechargeable battery module is placed into the electric vehicle if the rechargeable battery module has the newer version of the electric vehicle management program.

2. The rechargeable battery assembly according to claim 1, wherein the updating unit is stored with latest versions of the battery management program and the electric vehicle management program.

3. The rechargeable battery assembly according to claim 2, wherein the latest versions of the battery management program and the electric vehicle management program are downloaded to the updating unit via local area network (LAN), wide area network (WAN), wireless LAN or wireless WAN.

4. The rechargeable battery assembly according to claim 1, wherein the updating unit automatically detects version of the electric vehicle management program and updates the electric vehicle management program while a newer version of the electric vehicle management program is available while electrically connected to the electric vehicle.

5. The rechargeable battery assembly according to claim 1, wherein the management unit monitors operation performance and status of each rechargeable battery, and protects the rechargeable battery cells from over-heat, over-voltage, over-current and over-charge.

6. The rechargeable battery assembly according to claim 5, wherein the operation performance comprises output voltage, state of charge (SOC), depth of discharge (DOD), state of health (SOH), output current, maximum charge current, and maximum discharge current.

7. The rechargeable battery assembly according to claim 5, wherein the status of the rechargeable battery comprises cycle count and lifetime.

8. The rechargeable battery assembly according to claim 1, wherein the management unit comprises a programmable memory.

9. A charging module for providing power to a rechargeable battery module of an electric vehicle, comprising:
   an updating unit for automatically detecting a version of a battery management program installed in the rechargeable battery module and updating the battery management program while a newer version of the battery management program is available while electrically connected to the rechargeable battery module, wherein the electric vehicle is installed with an electric vehicle management program;

wherein the rechargeable battery module also stores a copy of the electric vehicle management program;

wherein the updating unit automatically detects the versions of the electric vehicle management programs installed with the electric vehicle and stored in the rechargeable battery module and updates the electric vehicle management programs which is installed with the electric vehicle while electrically connected to the electric vehicle or updates the electric vehicle management program which is stored in the rechargeable battery module while electrically connected to the rechargeable battery module while a newer version of the electric vehicle management program is available; and wherein the electric vehicle management program installed in the electric vehicle is additionally updated by the copy stored in the rechargeable battery module once the rechargeable battery module is placed into the electric vehicle if the rechargeable battery module has the newer version of the electric vehicle management program.

10. The charging module according to claim 9, wherein the updating unit is stored with latest versions of the battery management program and the electric vehicle management program.

11. The charging module according to claim 10, wherein the latest versions of the battery management program and the electric vehicle management program are downloaded to the updating unit via local area network (LAN), wide area network (WAN), wireless LAN or wireless WAN.

12. The charging module according to claim 9, wherein the updating unit automatically detects version of the electric vehicle management program and updates the electric vehicle management program while a newer version of the electric vehicle management program is available while electrically connected to the electric vehicle.

* * * * *